United States Patent
Udhayakumar et al.

(10) Patent No.: US 10,726,185 B2
(45) Date of Patent: Jul. 28, 2020

(54) BUFFER-BAY PLACEMENT IN AN INTEGRATED CIRCUIT

(71) Applicant: International Business Machines Corporation, Armonk, NY (US)

(72) Inventors: Jayaprakash Udhayakumar, Bangalore (IN); Sumantra Sarkar, Hebbal (IN); Chaitanya Kompalli, Bangalore (IN); Srinivasa Rahul Batchu, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/157,294

(22) Filed: Oct. 11, 2018

(65) Prior Publication Data
US 2020/0117768 A1    Apr. 16, 2020

(51) Int. Cl.
G06F 30/394    (2020.01)
G06F 30/392    (2020.01)
G06F 30/398    (2020.01)
G06F 111/04    (2020.01)
G06F 111/20    (2020.01)
G06F 119/12    (2020.01)
G06F 119/18    (2020.01)

(52) U.S. Cl.
CPC .......... *G06F 30/392* (2020.01); *G06F 30/394* (2020.01); *G06F 30/398* (2020.01); *G06F 2111/04* (2020.01); *G06F 2111/20* (2020.01); *G06F 2119/12* (2020.01); *G06F 2119/18* (2020.01)

(58) Field of Classification Search
USPC .......................................................... 716/114
See application file for complete search history.

(56) References Cited

U.S. PATENT DOCUMENTS

| 7,984,410 B2 | 7/2011 | Chen et al. |
| 7,934,188 B2 | 8/2011 | Alpert et al. |
| 8,689,170 B2 | 4/2014 | Ellavsky et al. |

(Continued)

OTHER PUBLICATIONS

C. Alpert, et al., "A Practical Methodology for Early Buffer and Wire Resource Allocation," IEEE Transactions on Computer-Aided Design of Integrated Circuits and Systems, vol. 22, No. 5, May 2003, 11 pages.

(Continued)

*Primary Examiner* — Bryce M Aisaka
(74) *Attorney, Agent, or Firm* — Cantor Colburn LLP; Steven Meyers

(57) ABSTRACT

Aspects include performing integrated circuit design. A processor identifies a child block of an integrated circuit for placement of a buffer-bay to insert a buffer in a portion of the integrated circuit reserved for the child block. The buffer-bay is divided into a plurality of buffer-bay segments. Parent-level routing information and one or more boundary conditions are analyzed to determine a plurality of placement options for the buffer-bay segments. A best possible placement is selected from the plurality of placement options for the buffer-bay segments as a planned buffer-bay layout. A routing of the integrated circuit is performed based on the planned buffer-bay layout.

20 Claims, 7 Drawing Sheets

(56) References Cited

U.S. PATENT DOCUMENTS

2009/0100397 A1* 4/2009 Palumbo ............. G06F 17/5072
                                                                  716/119
2017/0132349 A1   5/2017 Berry et al.

OTHER PUBLICATIONS

J Wang, et al., "Embedding Repeaters in Silicon IPs for Cross-IP Interconnections," IEEE Transactions on Very Large Scale Integration (VLSI) Systems, vol. 21, No. 3, Mar. 2013, 5 pages.
T. Chen, et al., "An Integrated Nonlinear Placement Framework with Congestion and Porosity Aware Buffer Planning," DAC 2008, Jun. 8-13, 2008, Anaheim, California, 6 pages.

* cited by examiner

BUFFER-BAY PLACEMENT IN AN INTEGRATED CIRCUIT

BACKGROUND

The present invention relates to integrated circuit design, and more specifically, to the buffer-bay placement in an integrated circuit.

An integrated circuit, such as a microprocessor, for example, is a collection of electronic circuits that are also referred to as a chip. Integrated circuit design involves several phases. In a logic design phase, transistors and other components (e.g., buffers, capacitors) that must be interconnected to fulfill the desired functionality of the integrated circuit are determined. In the physical synthesis phase, the placement of the components is determined. In addition to functionality, timing requirements are established for the final integrated circuit such that the chip must perform the specified functionality within a specified duration of time. In order to meet the timing requirements, timing analysis is performed at different phases of the design, and the design is modified to address components deemed responsible for the failure to meet timing requirements. An exemplary integrated circuit can include many components (e.g., over ten billion transistors). Integrated circuit design may be performed hierarchically with lower-level functions grouped as macros, which can also be referred to as child blocks relative to larger-scale parent blocks. For longer signal paths through an integrated circuit, repeaters or buffers are used to strengthen the signal. Design integrators can reserve space within child blocks for buffer placement, where the reserved space is referred to as buffer-bays. The buffer-bays can be utilized by design integrators but may be a hindrance to designers who must design around the buffer-bays, which may result in increased resource utilization, particularly in congested areas of an integrated circuit design.

SUMMARY

According to a non-limiting embodiment, a method includes identifying, by a processor, a child block of an integrated circuit for placement of a buffer-bay to insert a buffer in a portion of the integrated circuit reserved for the child block. The buffer-bay is divided into a plurality of buffer-bay segments. Parent-level routing information and one or more boundary conditions are analyzed to determine a plurality of placement options for the buffer-bay segments. A best possible placement is selected from the plurality of placement options for the buffer-bay segments as a planned buffer-bay layout. A routing of the integrated circuit is performed based on the planned buffer-bay layout.

According to a non-limiting embodiment, a system includes a memory device configured to store a design of an integrated circuit and a processor configured to perform a plurality of operations. The operations include identifying a child block of the design of the integrated circuit for placement of a buffer-bay to insert a buffer in a portion of the integrated circuit reserved for the child block. The buffer-bay is divided into a plurality of buffer-bay segments. Parent-level routing information and one or more boundary conditions are analyzed to determine a plurality of placement options for the buffer-bay segments. A best possible placement is selected from the plurality of placement options for the buffer-bay segments as a planned buffer-bay layout. A routing of the integrated circuit is performed based on the planned buffer-bay layout.

According to a non-limiting embodiment, a computer program product includes a computer readable storage medium having program instructions embodied therewith. The program instructions are executable by a processor to perform a plurality of operations including identifying a child block of the design of the integrated circuit for placement of a buffer-bay to insert a buffer in a portion of the integrated circuit reserved for the child block. The buffer-bay is divided into a plurality of buffer-bay segments. Parent-level routing information and one or more boundary conditions are analyzed to determine a plurality of placement options for the buffer-bay segments. A best possible placement is selected from the plurality of placement options for the buffer-bay segments as a planned buffer-bay layout. A routing of the integrated circuit is performed based on the planned buffer-bay layout.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
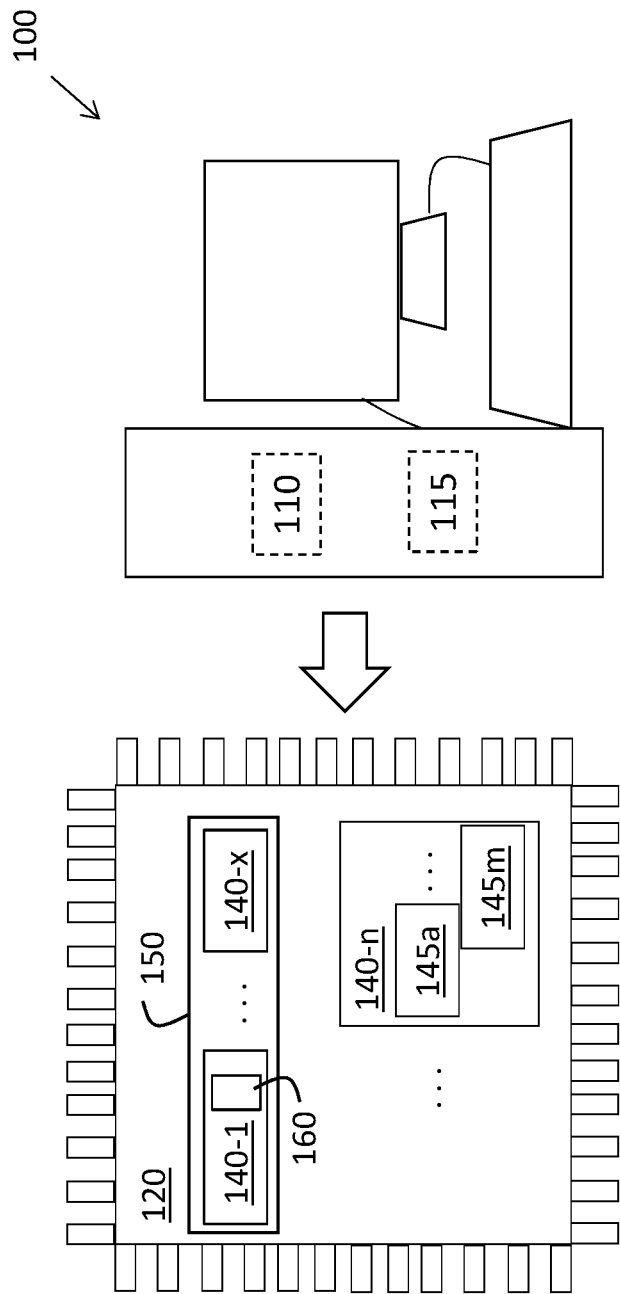
FIG. 1 is a block diagram of a system in accordance with various embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can include any integer number greater than or equal to one, i.e. one, two, three, four, etc. The terms "a plurality" can include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in integrated circuit design, buffers can be used to strengthen signals of long traveling wires. Integrated circuit designs can be hierarchically grouped into parent blocks (e.g., units) having one or more child blocks (e.g., macros). Buffers are typically placed at a predetermined distance from each other. If wires that need buffering are present in a child block, the wires can typically be buffered without issues. However, if the wires travel from one child block to another, which are placed far from each other, the wires may travel over other child blocks. In such a scenario, lower mask layers are typically "owned" by a child block designer and not by an integrator, who establishes child block-to-child block connections, such locations may not be available for adding buffers on the wires. To circumvent this problem, integrators may add placement blockages (referred to as buffer-bays) in child blocks, over which there is a high possibility of long wires at a higher level. A buffer-bay is typically only accessible by the integrator and not by the child block designer. The inclusion of a placement blockage presents a hindrance that may result in less efficient designs as the child block design is typically partitioned on either side of the placement blockage. If partitioning is not possible due to logic or available space, top-layer wires over the buffer-bay can be used, but such additional wiring may consume additional resources and obstruct other placements from more desirable locations.

Turning now to an overview of the aspects of the invention, one or more embodiments of the invention address the above-described shortcomings of the prior art by determining an optimized placement position of a buffer-bay within a child block. The resulting blockage of a buffer-bay can be decomposed into a plurality of smaller buffer-bay segments. Each buffer-bay segment placement option can be analyzed to determine a best achievable placement option and evaluate the need for each of the buffer-bay segments.

The above-described aspects of the invention address the shortcomings of the prior art by moving a buffer-bay within a child block to determine a best possible placement. The buffer-bay can be divided into a plurality of smaller segments, and a best possible placement can be determined for each of the buffer-bay segments. Parent-level routing information can be taken into consideration to make decisions about placement, such as the presence or removal of buffer-bay segments from placement options under consideration. A windowed approach to placement decisions can also be used for fixed height buffer-bay segment analysis, for example, while non-windowed approaches can consider variable heights of buffer-bay segments. Technical effects and benefits can include reduced resource utilization (e.g., reduction in wires, buffer, and/or space utilization) in an integrated circuit including child blocks. Embodiments can reduce congestion where many elements are tightly packed in the same area and provide increased design flexibility by reducing the adverse impact of placement blockages caused by buffer-bays.

FIG. 1 is a block diagram of a system 100 to perform buffer-bay placement for an integrated circuit design according to one or more embodiments of the invention. The system 100 includes a processor 110 (e.g., any type of processing circuitry) and a memory device 115 (e.g., any type of memory system) that is used to generate a design that is ultimately fabricated into an integrated circuit 120. The steps involved in the fabrication of the integrated circuit 120 are well-known and only briefly described herein and with reference to FIG. 7. The physical layout is finalized, in part, based on chip-level timing and placement analysis for buffer-bay placement according to embodiments of the invention. The finalized physical layout may be provided to a foundry or other manufacturing facility. Masks can be generated for each layer of the integrated circuit 120 based on the finalized physical layout. Then, the wafer is processed in the sequence of the mask order. The processing includes photolithography and etch. The fabrication is further discussed with reference to FIG. 7.

An exemplary hierarchical organization of the integrated circuit 120 is shown in FIG. 1, but more or fewer hierarchical levels are contemplated in alternate embodiments. As shown, the integrated circuit design is partitioned into child blocks 140-1 through 140-n (generally referred to as 140). An exemplary child block 140-n is shown with components 145a through 145m (generally referred to as 145) that are interconnected by wires (not shown). Two or more child blocks 140 can be grouped into parent blocks 150. While only one exemplary parent block 150 is indicated, all of the child blocks 140 may be part of a parent block 150. The three hierarchical levels shown in FIG. 1 include the child block level, the parent block level, and the chip level. Chip-level integrators may perform placement on parent blocks 150 and determine routing paths between the parent blocks 150, which may include wires that travel over child blocks 140.

One or more signals are input to each child block 140 and traverse paths defined by the wires through the components 145 to one or more outputs of the child block 140. The integrated circuit 120, which is made up of the child blocks 140 that are part of the parent blocks 150, has one or more signals that traverse the child blocks 140 to one or more outputs. Thus, the timing requirement for the integrated circuit 120, which defines the maximum duration within which the signals must traverse the collection of child blocks 140, can be broken down and addressed at the child block level as timing requirements for each of the child blocks 140. Child blocks 140 that fail to meet their individual timing requirements may be redesigned to ensure that, when put together with other child blocks 140, the integrated circuit 120 meets its timing requirement. Insertion of a buffer bay 160 into child block 140-1, for example, to reserve space for a buffer to support wiring between parent blocks 150, may impact timing and resource utilization of child block 140-1. Embodiments constrain the placement impact of one or more buffer-bays 160 in child blocks 140 to reduce potential adverse effects with respect to timing, congestion, and/or other metrics.

Figure 2:
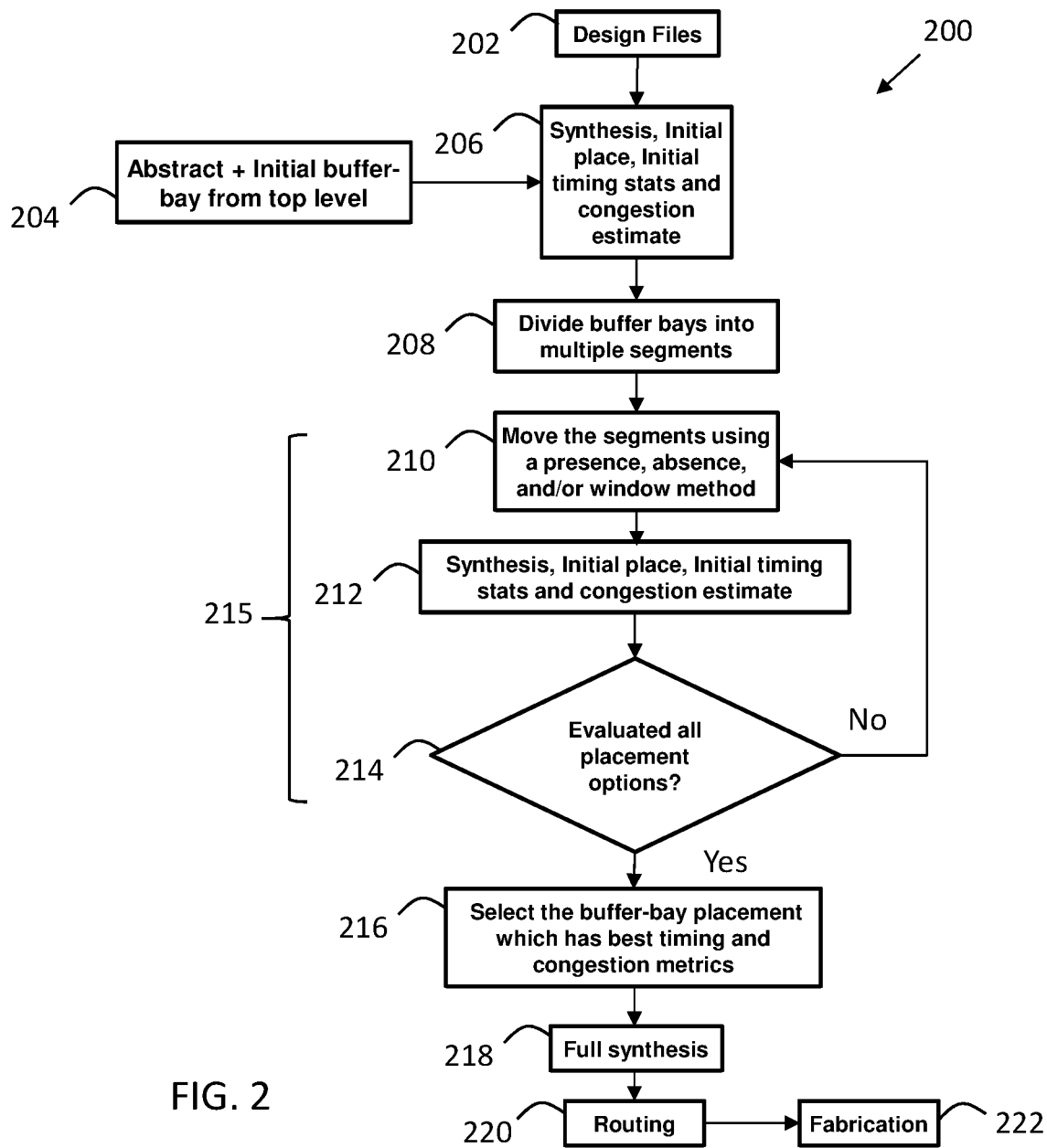
FIG. 2 is a flow diagram illustrating a method according to a non-limiting embodiment.

FIG. 2 illustrates an exemplary process 200 of performing integrated circuit design with consideration given to placement of buffer-bays 160 of FIG. 1. The process 200 can be performed by the processor 110 of FIG. 1. In the example of FIG. 2, the processor 110 can access design files 202 from memory device 115 of FIG. 1 along with receiving an abstract and an initial buffer-bay allocation from a top level at block 204. At block 206, the processor 110 can identify a child block 140 of the integrated circuit 120 for placement of a buffer-bay 160 to insert a buffer in a portion of the integrated circuit 120 reserved for the child block 140. To characterize the initial buffer-bay 160 placement, the processor 110 can also perform synthesis, determine initial placement timing statistics, and determine a congestion estimate for the child block 140. At block 208, the processor 110 can divide the buffer-bay 160 into a plurality of buffer-bay segments.

Buffer-bay analysis 215 can include analyzing, by the processor 110, parent-level routing information and one or more boundary conditions to determine a plurality of placement options for the buffer-bay segments. The buffer-bay analysis 215 may include moving the buffer-bay segments at block 210 using one or more of a presence, absence, and/or window method as further described with respect to FIGS. 3-6. The buffer-bay analysis 215 can also include synthesis, initial placement, initial timing statistics generation, and a congestion estimate for placement options at block 212. Further as part of the buffer-bay analysis 215, at block 214, the processor 110 can determine whether all placement options have been evaluated, and if not, return to block 210 of the buffer-bay analysis 215.

If all placement options have been evaluated, then at block 216, the processor 110 can select a best possible placement from the plurality of placement options for the buffer-bay segments as a planned buffer-bay layout. The best possible placement can be determined based on the best timing and congestion metrics of the child 140-1 of FIG. 1 from the placement options analyzed. At block 218, a full synthesis can be performed. At block 220, the processor 110 can perform a routing of the integrated circuit 120 based on the planned buffer-bay layout. At block 222, resulting files can be provided for fabrication of the integrated circuit 120. The process 200 can be expanded or repeated to determine the planned buffer-bay layout for a plurality of child blocks 140 of the integrated circuit 120 and perform routing of the integrated circuit 120 based on the planned buffer-bay layout for the plurality of child blocks 140.

To minimize run length, a bounding box (Bbox) can be created over possible locations of the buffer bay 160, and a cost function (C) can be computed for each location. A plurality of cost functions can be defined based on the number of buffer-bay segment splits. For example, a cost function can be defined as: $C(n,X1,X2 \ldots Xn+1)=CG$ (congestion over Bbox)+CD(average cell density over Bbox)+CS(slack of gates under Bbox)+CSN(Slack of nets crossing the box). Here, $CG(n,X1,X2 \ldots Xn+1)$ is a weighted average sum of congestion over each metal layer. Weights can be based on buffer bay blockage. $CS(n,X1,X2 \ldots Xn+1)$ is an average slack of all the gates under Bbox. $CSN(n,X1,X2 \ldots Xn+1)$ is an average slack of all the nets crossing Bbox. All of the cost function results can be ranked for multiple split options, where the least cost has the highest rank. Results of the lowest cost functions can be simulated in greater detail to confirm actual cost metrics and select locations and the number of splits having the most optimal performance.

Figure 3:
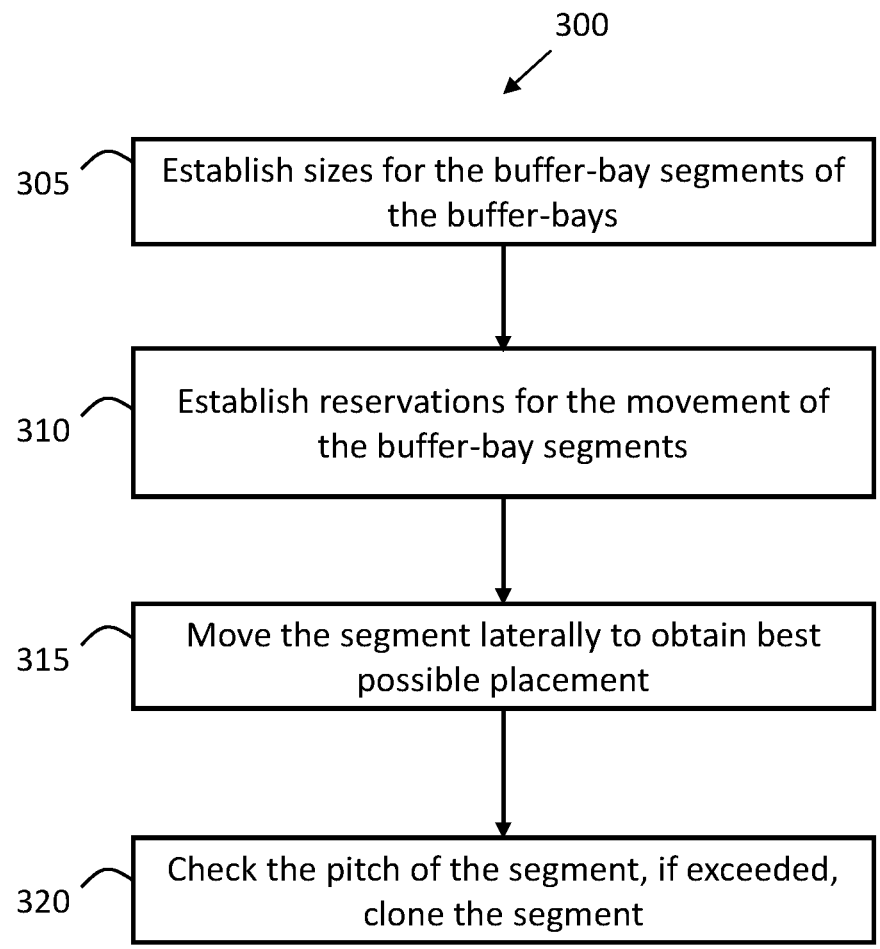
FIG. 3 is a flow diagram illustrating a method according to a non-limiting embodiment.

FIG. 3 is a process flow 300 of a method for sizing and analysis of buffer-bay segments according to one or more embodiments of the invention. The process flow 300 can be performed by the processor 110 of FIG. 1 in support of the process 200 of FIG. 2. At block 305, the processor 110 can establish sizes of the buffer-bay segments for the buffer-bays 160 of FIG. 1. For example, in some analysis approaches, buffer-bay segments may be fixed in size (e.g., height), while in other analysis approaches the size of buffer-bay segments can vary. At block 310, the processor 110 can establish reservations for the movement of the buffer-bay segments. For instance, some analysis approaches may use random placement, while others may follow a fixed pattern, such as a sliding placement window.

At block 315, the processor 110 can move the planned placement of a buffer-bay laterally to determine a best possible placement. The position of buffer-bay segments can be iteratively adjusted, and the processor 110 can determine a plurality of timing and congestion impacts based on the adjusting. At block 320, the processor 110 can check the pitch of a buffer-bay segment, and if a pitch limit (e.g., a maximum distance) is exceeded, the processor 110 can clone the buffer-bay segment. For instance, there may be a maximum separation distance between buffer-bay segments at a same layer within the child block 140. If a variation shifts one of the buffer-bays towards an outer edge, a spacing constraint may be violated, and a clone of the buffer-bay segment can be inserted at the same layer to ensure that the spacing constraint is maintained. There may be a number of other placement constraints, such as boundary margins, minimum sizing, maximum sizing, and the like. Further, to avoid an excessive number of segments, the processor 110 can merge two or more buffer-bay segments positioned within a threshold distance of each other.

Figure 4:
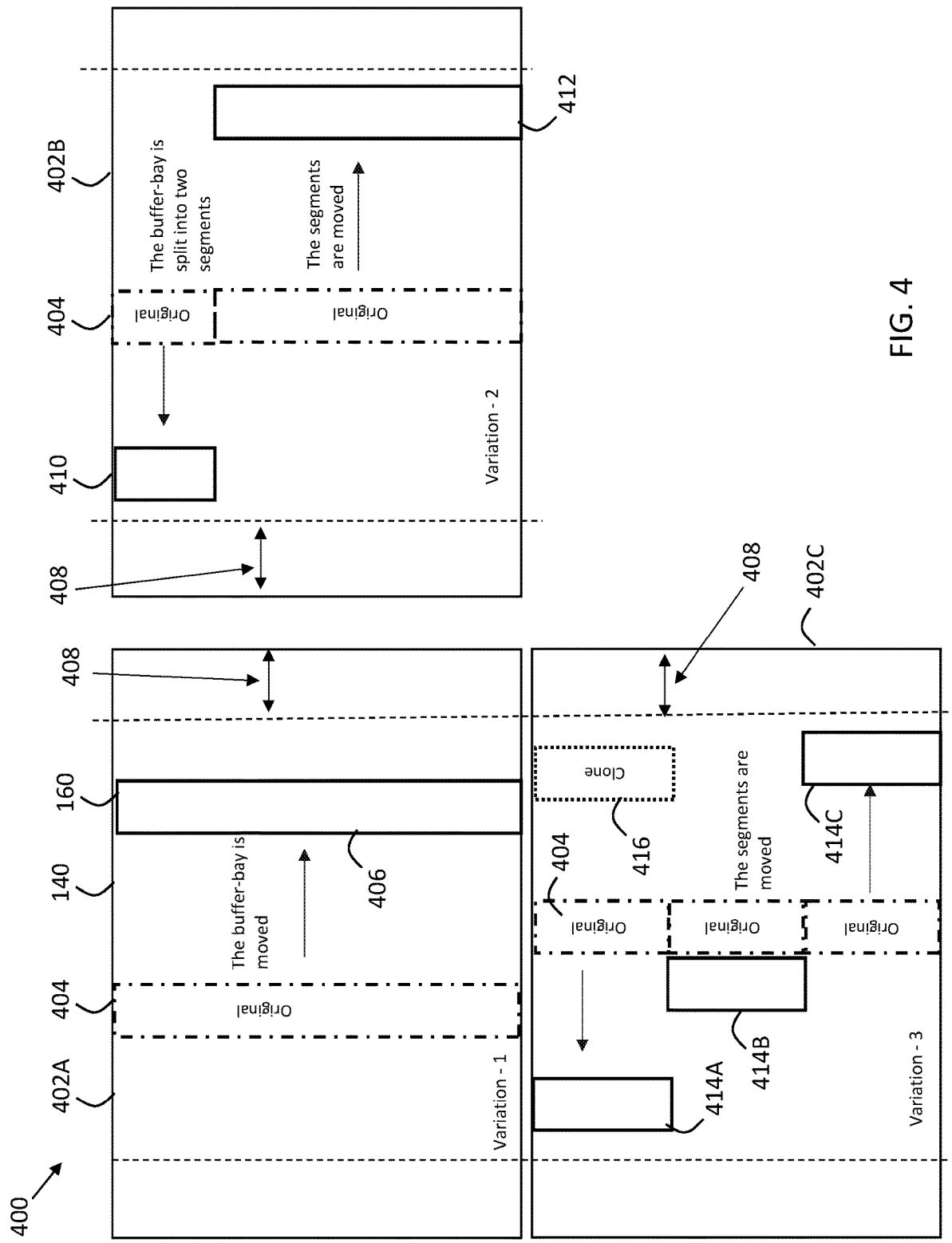
FIG. 4 is a block diagram of a presence approach to buffer-bay segment placement according to a non-limiting embodiment.

FIG. 4 is a block diagram 400 of a presence approach to buffer-bay segment placement according to a non-limiting embodiment. An embodiment of child block 140 is depicted as a first variation 402A, a second variation 402B, and a third variation 402C. In the first variation 402A, a buffer-bay 160 is re-positioned from an initial position 404 to an adjusted position 406 while keeping the buffer-bay 160 within a minimum boundary distance 408 from an outer edge of the child block 140.

In the second variation 402B, the buffer-bay 160 is split into a first buffer-bay segment 410 and a second buffer-bay segment 412. The first and second buffer-bays 410, 412 can be separately shifted laterally from the initial position 404 within the child block 140 while remaining within the minimum boundary distance 408 from an outer edge of the child block 140. The second variation 402B is an example of creating a plurality of height variations of the buffer-bay segments 410, 412 while maintaining a constant total height of the buffer-bay segments 410, 412 (e.g., adds up to the height of buffer-bay 160).

In the third variation 402C, buffer-bay segments 414A, 414B, 414C can be separately shifted laterally from the initial position 404 within the child block 140 while remaining within the minimum boundary distance 408 from an outer edge of the child block 140. The third variation 402C also illustrates an example of a clone 416, which is a laterally offset copy of the buffer-bay segment 414A in this example. The clone 416 may be created where there may otherwise be too long of a gap between the buffer-bay segment 414A and an outer edge of the child block 140. For instance, a pitch limit may be 120 micrometers, but if the buffer-bay segment 414A is 165 micrometers from an outer edge of the child block, the clone 416 can be added within the pitch limit. Both the clone 416 and corresponding buffer-bay segment 414A can be moved to determine the plurality of placement options for the buffer-bay segments 414A-414C. Repositioning of the buffer-bay segments 414A-414C can be performed across quantized locations in the portion of the integrated circuit 120 reserved for the child block 140. For example, there can be a limited number of discrete size and placement options based on a given width and minimum height per segment. While FIG. 4 depicts three similarly sized buffer-bay segments 414A-414C, any number and sizing variation can be supported and analyzed within supported physical constraints and boundaries.

As other variations to a presence approach for block 210 of FIG. 2, the buffer-bay 160 can be divided into a varying number of segments. The number of variations in this approach increases with the height of the buffer bay 160 and the reduction in the size of the smallest segment. The number of variations m, is calculated by m=Total height of the buffer-bay/minimum height of the segment. The processor 110 can increase the height of each segment by Yum (where Yum is the height of the smallest segment) in turns for each variation, while keeping the total height constant and the individual height of the segments from violating a minimum height restriction. The processor 110 may move each segment laterally to a random location, independent of the other segments. The processor 110 can merge the segments, which are closer than X distance from each other, at the end of each variation. The quality of each variation can be decided based on output statistics observed from running the initial placement. For example, segments can be placed randomly at quantized locations ranging from 0, 1, 2, . . . n, where n=(available width of the child block/width of the segment). A random number generator can be used to find the location number for each segment individually, such that the segments are not dependent. If a buffer-bay segment violates a placement pitch of the buffer-bay 160, then the segment may be cloned laterally, and both of the segment and the clone can be moved for each iteration.

Figure 5:
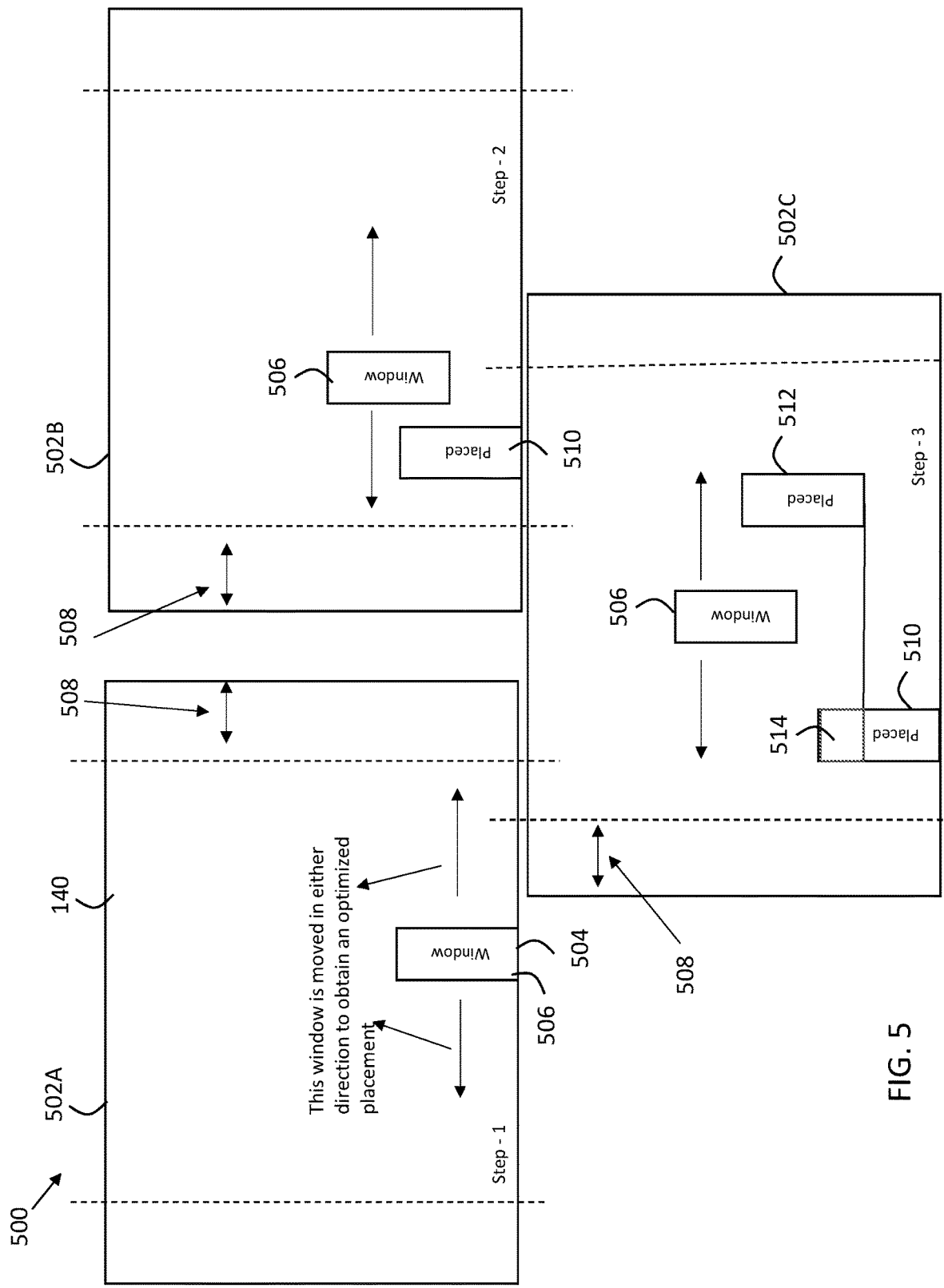
FIG. 5 is a block diagram of a window approach to buffer-bay segment placement according to a non-limiting embodiment.

FIG. 5 is a block diagram 500 of a window approach to buffer-bay segment placement according to a non-limiting embodiment. An embodiment of child block 140 is depicted in a first step 502A, a second step 502B, and a third step 502C. In the first step 502A, a placement window 506 at an initial position 504 can be moved along a width of the child block 140 to place an initial buffer-bay segment 510 as depicted in the second step 502B. Movement of the placement window 506 is constrained within a minimum boundary distance 508 from an outer edge of the child block 140. The processor 110 can continue shifting the placement window 506 vertically and repeating the moving of the placement window 506 along the width of the child block 140 to place one or more subsequent buffer-bay segments 512 as depicted in the third step 502C.

There can be a placement window 506 of height Hum, which may be configured by a user of the system 100 of FIG. 1. At each location of the placement window 506, an initial placement can be performed to quantify a resulting placement quality. At the best-observed location, a buffer-bay segment can be fixed. At the end of an iteration, the placement window 506 can be moved up a height of Yum, and the same process is repeated. An overlapping portion 514 of the first placed buffer-bay segment 510 can be deleted after the second buffer-bay segment 512 is placed. The same process can be repeated until the full length of the child block 140 is covered. At the end, the placed bay segments can be merged, if the segments are placed close to each other within a threshold distance. The number of steps increases with an increase in the size of the buffer-bay 160 and a reduction in the height of the placement window 506. If a buffer-bay segment violates a placement pitch of the buffer-bay 160, then the buffer-bay segment can be cloned laterally, and both of the clone and the corresponding buffer-bay segment can be moved for each iteration.

Figure 6:
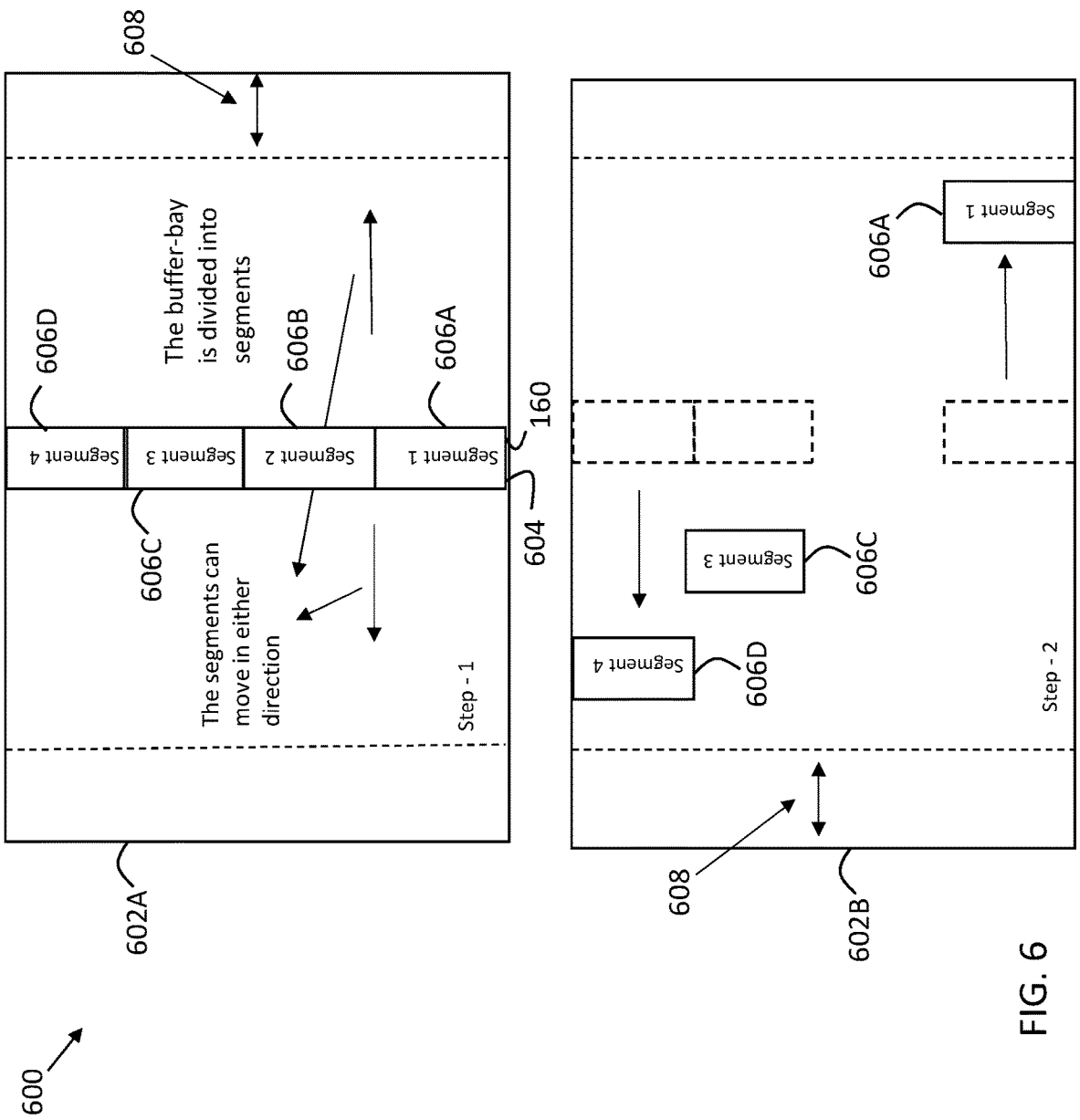
FIG. 6 is a block diagram of an absence approach to buffer-bay segment placement according to a non-limiting embodiment.

FIG. 6 is a block diagram 600 of an absence approach to buffer-bay segment placement according to a non-limiting embodiment. An embodiment of child block 140 is depicted as a first step 602A and a second step 602B. In the absence approach, the segment size can be decided by a user of the system 100 of FIG. 1. The buffer-bay 160 can be divided into a maximum number of segments before a first iteration at an initial position 604. In this approach, the processor 110 can observe the routing data from the parent block 150 of FIG. 1 to determine routing congestion through a plurality of segments, such as buffer-bay segments 606A, 606B, 606C, 606D in the example of FIG. 6. A minimum and maximum congestion threshold for the parent block 150 of FIG. 1 can be decided by the user. If the congestion is above the maximum congestion threshold, then the corresponding segment is not deleted in any of the iterations such as buffer-bay segment 606D. If the congestion is below the minimum congestion threshold, then the buffer-bay segment is deleted, such as buffer-bay segment 606B, between the first and second steps 602A, 602B. In the first iteration, one of the segments that can be deleted (e.g., buffer-bay segment 606B), may be removed and the remaining buffer-bay segments 606A, 606C, 606D can be moved around to find the best placement. Movement can be constrained within a minimum boundary distance 608 from an outer edge of the child block 140. The same process can be performed with other buffer-bay segments. In the second iteration, two of the buffer-bay segments (e.g., buffer-bay segments 606B, 606C) can be removed, and the process is repeated. A trade-off can be made between losing a buffer-bay segment and the improvements shown in the design. A best possible output can be selected based on the trade-off. Similar to the other described approaches, if a buffer-bay segment 606A-606D violates a placement pitch of the buffer-bay 160, then the corresponding buffer-bay segment can be cloned laterally and both of the buffer-bay segment and clone can be moved for each iteration.

Thus, in the absence approach, the processor 110 can determine a level of congestion of the buffer-bay segments 606A-606D. The processor 110 can remove one or more of the buffer-bay segments 606A-606D from one or more locations having the lowest level of congestion. The processor 110 can reposition one or more remaining buffer-bay segments 606A-606D.

Figure 7:
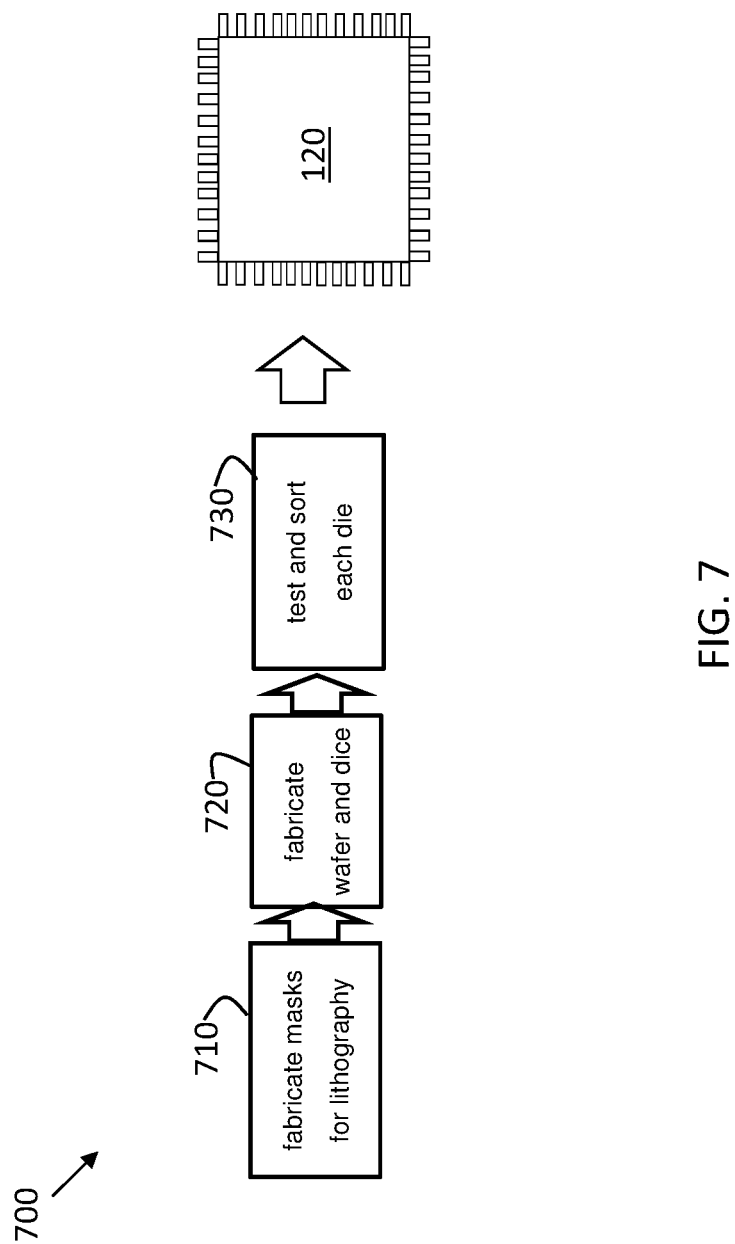
FIG. 7 is a flow diagram illustrating a method according to a non-limiting embodiment.

FIG. 7 is a process flow 700 of a method of fabricating the integrated circuit 120 designed according to one or more embodiments of the invention. Once the physical design data is obtained, based, in part, on performing the process 200 of FIG. 2 according to one or more embodiments of the invention, the processes shown in FIG. 7 can be performed to fabricate the integrated circuit 120. Generally, a wafer with multiple copies of the final design is fabricated and cut (i.e., diced) such that each die is one copy of the integrated circuit 120. At block 710, the processes include fabricating masks for lithography based on the finalized physical layout. At block 720, fabricating the wafer includes using the masks to perform photolithography and etching. Once the wafer is diced, testing and sorting each die is performed, at block 730, to filter out any faulty die.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of performing integrated circuit design, the method comprising:
    identifying, using a processor, a child block of an integrated circuit for placement of a buffer-bay to insert a buffer in a portion of the integrated circuit reserved for the child block;
    dividing, using the processor, the buffer-bay into a plurality of buffer-bay segments;
    analyzing, using the processor, parent-level routing information and one or more boundary conditions to determine a plurality of placement options for the buffer-bay segments;
    cloning one of the buffer-bay segments based on identifying a buffer-bay segment pitch exceeding a pitch limit;
    moving both a clone and a corresponding buffer-bay segment to determine the plurality of placement options for the buffer-bay segments;
    merging two of the buffer-bay segments positioned within a threshold distance of each other;
    selecting, using the processor, a best possible placement from the plurality of placement options for the buffer-bay segments as a planned buffer-bay layout; and
    performing, using the processor, a routing of the integrated circuit based on the planned buffer-bay layout.

2. The computer-implemented method according to claim 1, further comprising:
    determining the planned buffer-bay layout for a plurality of child blocks of the integrated circuit; and
    performing the routing of the integrated circuit based on the planned buffer-bay layout for the plurality of child blocks.

3. The computer-implemented method according to claim 1, further comprising:
    iteratively adjusting a position of one or more of the buffer-bay segments; and
    determining a plurality of timing and congestion impacts based on the adjusting.

4. The computer-implemented method according to claim 3, wherein iteratively adjusting the position of one or more of the buffer-bay segments comprises:
    creating a plurality of height variations of the buffer-bay segments while maintaining a constant total height of the buffer-bay segments; and
    repositioning one or more of the buffer-bay segments across quantized locations in the portion of the integrated circuit reserved for the child block.

5. The computer-implemented method according to claim 3, wherein iteratively adjusting the position of one or more of the buffer-bay segments comprises:
    moving a placement window along a width of the child block to place an initial buffer-bay segment; and
    shifting the placement window vertically and repeating the moving of the placement window along the width of the child block to place one or more subsequent buffer-bay segment.

6. The computer-implemented method according to claim 3, wherein iteratively adjusting the position of one or more of the buffer-bay segments comprises:
    determining a level of congestion of the buffer-bay segments;
    removing one or more of the buffer-bay segments from one or more locations having a lowest level of congestion; and
    repositioning one or more remaining buffer-bay segments.

7. A system to perform integrated circuit design, the system comprising:
    a memory device configured to store a design of an integrated circuit; and
    a processor configured to perform a plurality of operations comprising:
        identifying a child block of the design of the integrated circuit for placement of a buffer-bay to insert a buffer in a portion of the integrated circuit reserved for the child block;
        dividing the buffer-bay into a plurality of buffer-bay segments;
        analyzing parent-level routing information and one or more boundary conditions to determine a plurality of placement options for the buffer-bay segments;
        cloning one of the buffer-bay segments based on identifying a buffer-bay segment pitch exceeding a pitch limit;
        moving both a clone and a corresponding buffer-bay segment to determine the plurality of placement options for the buffer-bay segments;
        merging two of the buffer-bay segments positioned within a threshold distance of each other;
        selecting a best possible placement from the plurality of placement options for the buffer-bay segments as a planned buffer-bay layout; and
        performing a routing of the integrated circuit based on the planned buffer-bay layout.

8. The system according to claim 7, wherein the processor is configured to perform the plurality of operations comprising:

determining the planned buffer-bay layout for a plurality of child blocks of the integrated circuit; and performing the routing of the integrated circuit based on the planned buffer-bay layout for the plurality of child blocks.

9. The system according to claim 7, wherein the processor is configured to perform the plurality of operations comprising:

iteratively adjusting a position of one or more of the buffer-bay segments; and determining a plurality of timing and congestion impacts based on the adjusting.

10. The system according to claim 9, wherein iteratively adjusting the position of one or more of the buffer-bay segments comprises:

creating a plurality of height variations of the buffer-bay segments while maintaining a constant total height of the buffer-bay segments; and repositioning one or more of the buffer-bay segments across quantized locations in the portion of the integrated circuit reserved for the child block.

11. The system according to claim 9, wherein iteratively adjusting the position of one or more of the buffer-bay segments comprises:

moving a placement window along a width of the child block to place an initial buffer-bay segment; and shifting the placement window vertically and repeating the moving of the placement window along the width of the child block to place one or more subsequent buffer-bay segment.

12. The system according to claim 9, wherein iteratively adjusting the position of one or more of the buffer-bay segments comprises:

determining a level of congestion of the buffer-bay segments;

removing one or more of the buffer-bay segments from one or more locations having a lowest level of congestion; and repositioning one or more remaining buffer-bay segments.

13. A computer program product for performing integrated circuit design, the computer program product comprising a computer readable storage medium having program instructions embodied therewith, the program instructions executable by a processor to perform a plurality of operations comprising:

identifying a child block of the design of the integrated circuit for placement of a buffer-bay to insert a buffer in a portion of the integrated circuit reserved for the child block;

dividing the buffer-bay into a plurality of buffer-bay segments;

analyzing parent-level routing information and one or more boundary conditions to determine a plurality of placement options for the buffer-bay segments;

cloning one of the buffer-bay segments based on identifying a buffer-bay segment pitch exceeding a pitch limit;

moving both a clone and a corresponding buffer-bay segment to determine the plurality of placement options for the buffer-bay segments;

merging two of the buffer-bay segments positioned within a threshold distance of each other;

selecting a best possible placement from the plurality of placement options for the buffer-bay segments as a planned buffer-bay layout; and performing a routing of the integrated circuit based on the planned buffer-bay layout.

14. The computer program product according to claim 13, wherein the operations further comprise:

determining the planned buffer-bay layout for a plurality of child blocks of the integrated circuit; and performing the routing of the integrated circuit based on the planned buffer-bay layout for the plurality of child blocks.

15. The computer program product according to claim 13, wherein the operations further comprise:

iteratively adjusting a position of one or more of the buffer-bay segments; and determining a plurality of timing and congestion impacts based on the adjusting.

16. The computer program product according to claim 15, wherein iteratively adjusting the position of one or more of the buffer-bay segments comprises:

creating a plurality of height variations of the buffer-bay segments while maintaining a constant total height of the buffer-bay segments; and repositioning one or more of the buffer-bay segments across quantized locations in the portion of the integrated circuit reserved for the child block.

17. The computer program product according to claim 15, wherein iteratively adjusting the position of one or more of the buffer-bay segments comprises:

moving a placement window along a width of the child block to place an initial buffer-bay segment; and shifting the placement window vertically and repeating the moving of the placement window along the width of the child block to place one or more subsequent buffer-bay segment.

18. The computer program product according to claim 15, wherein iteratively adjusting the position of one or more of the buffer-bay segments comprises:

determining a level of congestion of the buffer-bay segments;

removing one or more of the buffer-bay segments from one or more locations having a lowest level of congestion; and repositioning one or more remaining buffer-bay segments.

19. The computer program product according to claim 13, wherein the operations further comprise:

performing a removal-based adjustment of the one or more of the buffer-bay segments;

performing a window-based placement of the one or more of the buffer-bay segments; and selecting the best possible placement based on a plurality of results of the merging, the removal-based adjustment, and the window-based placement.

20. The computer-implemented method according to claim 1, further comprising:

performing a removal-based adjustment of the one or more of the buffer-bay segments;

performing a window-based placement of the one or more of the buffer-bay segments; and selecting the best possible placement based on a plurality of results of the merging, the removal-based adjustment, and the window-based placement.

* * * * *